United States Patent
Shauh et al.

(10) Patent No.: US 9,369,976 B2
(45) Date of Patent: Jun. 14, 2016

(54) SUPPORTING COORDINATED UNIVERSAL TIME IN LTE

(71) Applicant: QUALCOMM Incorporated, San Diego, CA (US)

(72) Inventors: Jack Shyh-Hurng Shauh, San Diego, CA (US); Shailesh Maheshwari, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 129 days.

(21) Appl. No.: 13/914,561

(22) Filed: Jun. 10, 2013

(65) Prior Publication Data

US 2014/0003417 A1    Jan. 2, 2014

Related U.S. Application Data

(60) Provisional application No. 61/664,941, filed on Jun. 27, 2012.

(51) Int. Cl.
  *H04W 56/00* (2009.01)
  *G04R 20/18* (2013.01)
  *G04R 20/00* (2013.01)

(52) U.S. Cl.
  CPC ............ *H04W 56/001* (2013.01); *G04R 20/18* (2013.01); *G04R 20/00* (2013.01); *H04W 56/00* (2013.01)

(58) Field of Classification Search
  USPC .................. 370/328, 345, 310, 350, 312, 503
  See application file for complete search history.

(56) References Cited

U.S. PATENT DOCUMENTS

| | | | |
|---|---|---|---|
| 6,963,588 B1 | 11/2005 | Lynch et al. | |
| 7,385,878 B2 | 6/2008 | Cho | |
| 7,813,225 B2 | 10/2010 | Urano | |
| 2003/0214936 A1* | 11/2003 | Goff | 370/350 |
| 2008/0102749 A1* | 5/2008 | Becker | H04L 12/1877 455/3.06 |
| 2008/0165628 A1 | 7/2008 | Urano | |
| 2009/0110132 A1 | 4/2009 | Kondrad et al. | |
| 2010/0034190 A1* | 2/2010 | Yun et al. | 370/350 |
| 2010/0290437 A1* | 11/2010 | Wang | H04W 76/026 370/335 |
| 2013/0044670 A1* | 2/2013 | Jang | H04W 4/06 370/312 |

FOREIGN PATENT DOCUMENTS

WO    2009053899 A2    4/2009

OTHER PUBLICATIONS

Universal Mobile Telecommunications System (UMTS); LTE; Multimedia Broadcast/Multicast Service (MBMS): Protocols and codecs (3GPP TS 26.346 version 9.3.0 Release 9) (Jun. 2010).*
International Search Report and Written Opinion—PCT/US2013/045137—ISA/EPO—Feb. 18, 2014.
Gross K., et al., "RTP and Leap Seconds draft-ietf-avtcore-leap-second-02," RTP Leap Seconds, Internet-Draft, Feb. 2013, pp. 1-8.

\* cited by examiner

*Primary Examiner* — Habte Mered
*Assistant Examiner* — Rownak Islam
(74) *Attorney, Agent, or Firm* — Arent Fox LLP

(57) ABSTRACT

A method, an apparatus, and a computer program product for wireless communication are provided. The apparatus receives a CDMA system time from a SIB. The apparatus receives information indicating a number of leap seconds. The information may be received through provisioning information at boot up, a USD, or other means. The apparatus determines a UTC based on the received CDMA system time and the number of leap seconds. The apparatus applies the determined UTC. The apparatus may receive an eMBMS service based on the determined UTC.

17 Claims, 11 Drawing Sheets

SUPPORTING COORDINATED UNIVERSAL TIME IN LTE

CROSS-REFERENCE TO RELATED APPLICATION(S)

This application claims the benefit of U.S. Provisional Application Ser. No. 61/664,941, entitled "SUPPORTING COORDINATED UNIVERSAL TIME IN LTE" and filed on Jun. 27, 2012, which is expressly incorporated by reference herein in its entirety.

BACKGROUND

1. Field

The present disclosure relates generally to communication systems, and more particularly, to supporting coordinated universal time (UTC) in Long Term Evolution (LTE), and specifically in evolved Multimedia Broadcast Multicast Service (eMBMS).

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is LTE. LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus receives a CDMA system time from a system information block (SIB). The apparatus receives information indicating a number of leap seconds. The apparatus determines a UTC based on the received CDMA system time and the number of leap seconds. The apparatus applies the determined UTC. In one configuration, the apparatus receives an eMBMS service based on the determined UTC.

DETAILED DESCRIPTION

Figure 1:
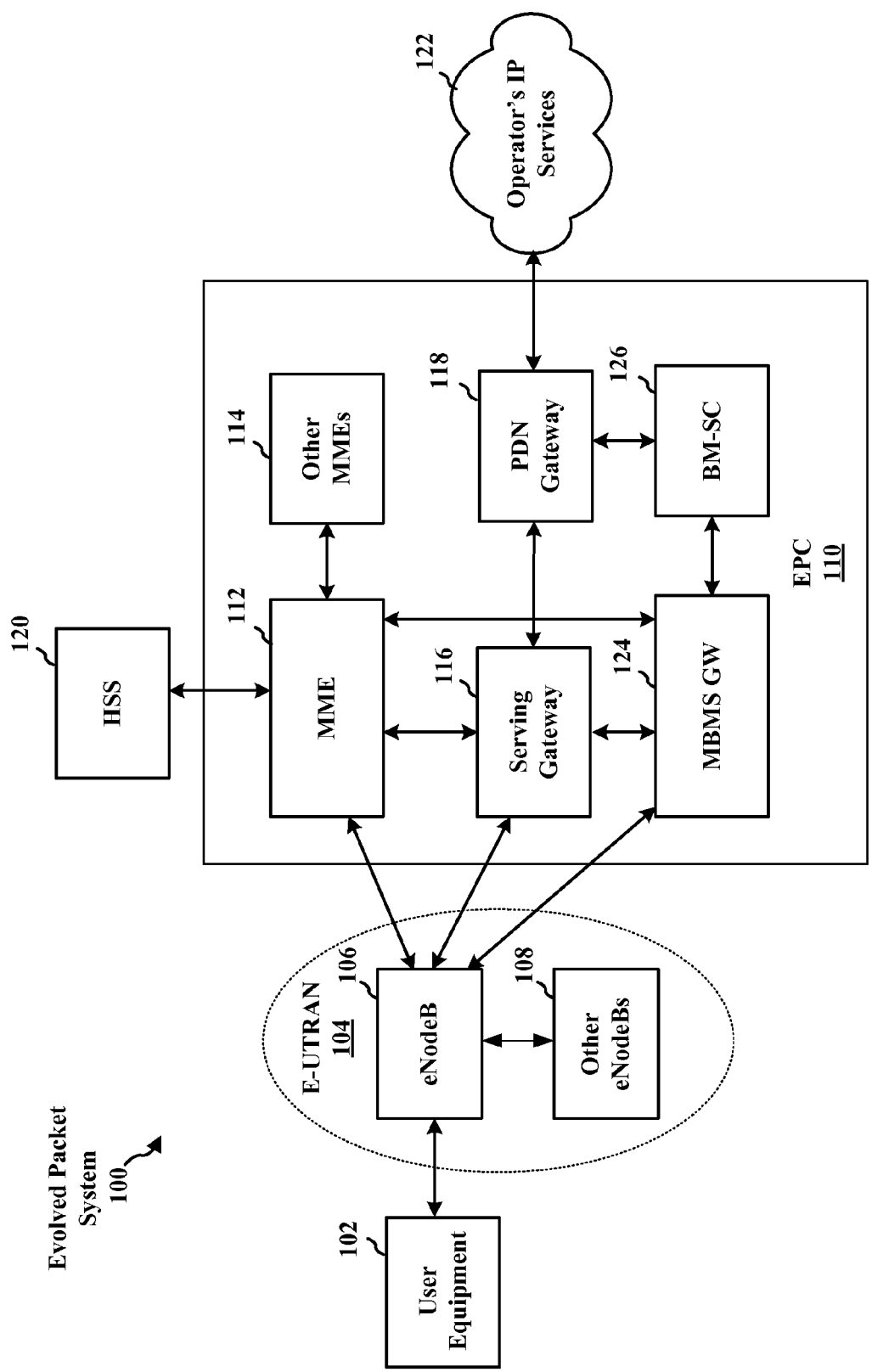
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
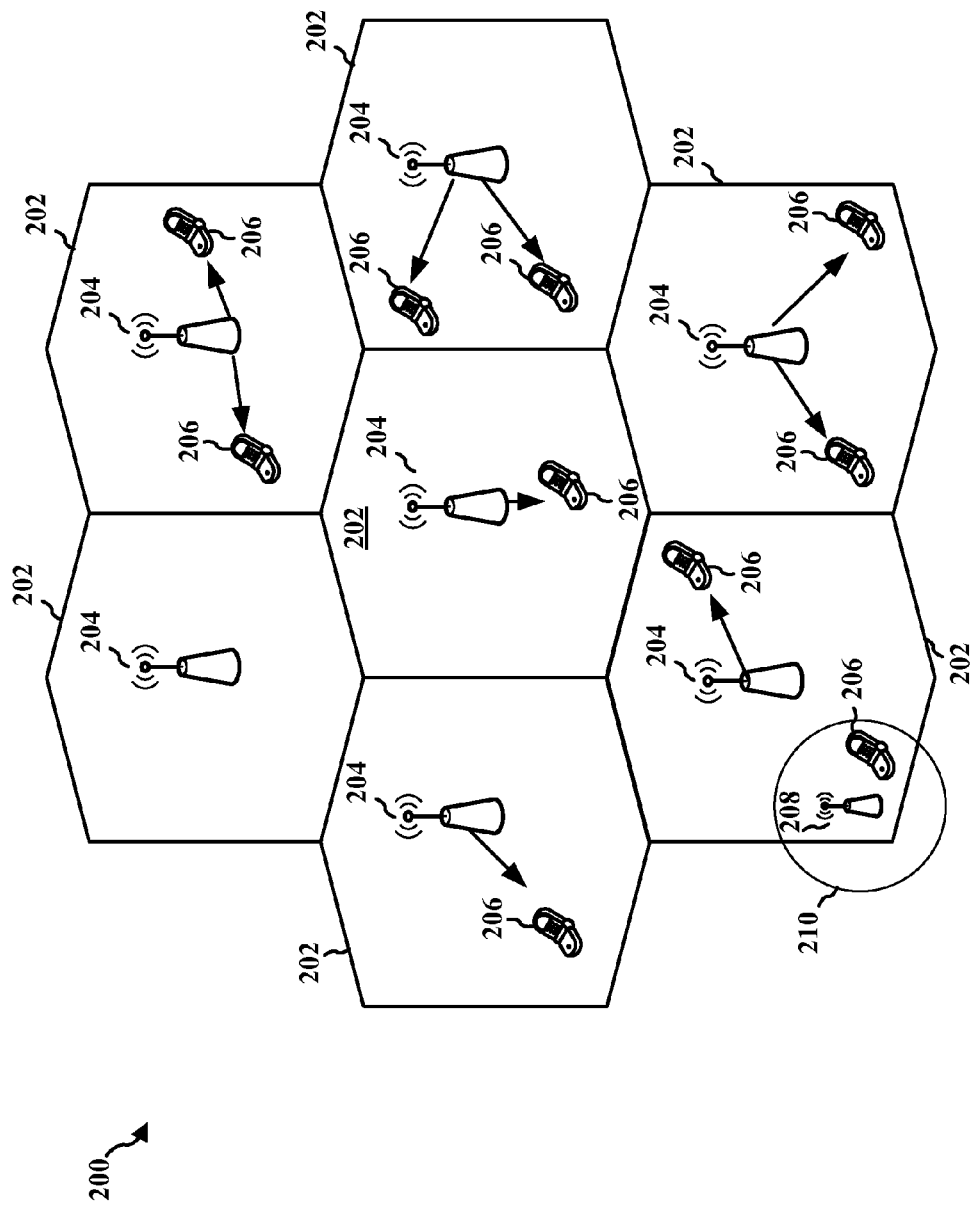
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sector). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi- Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
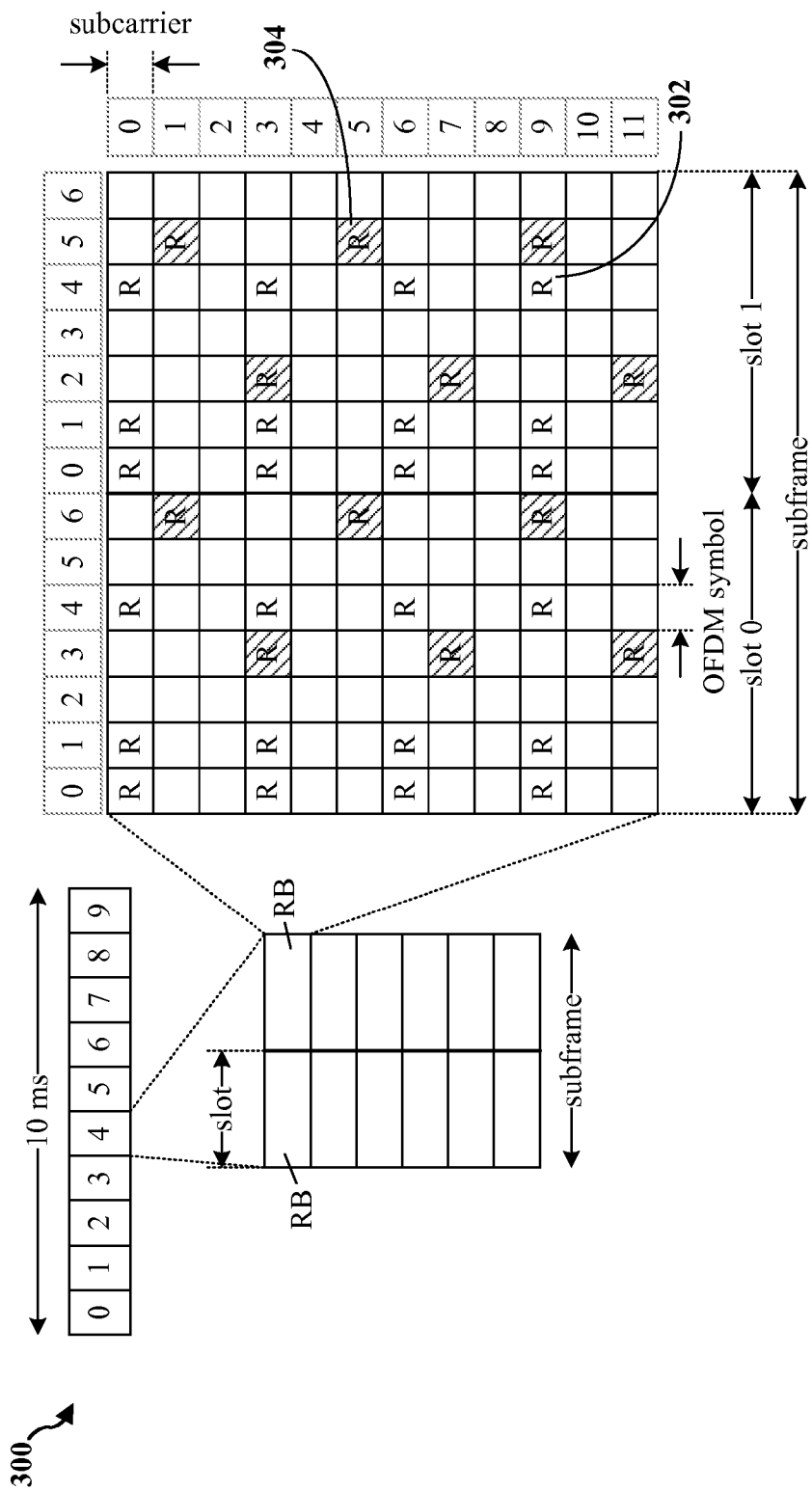
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
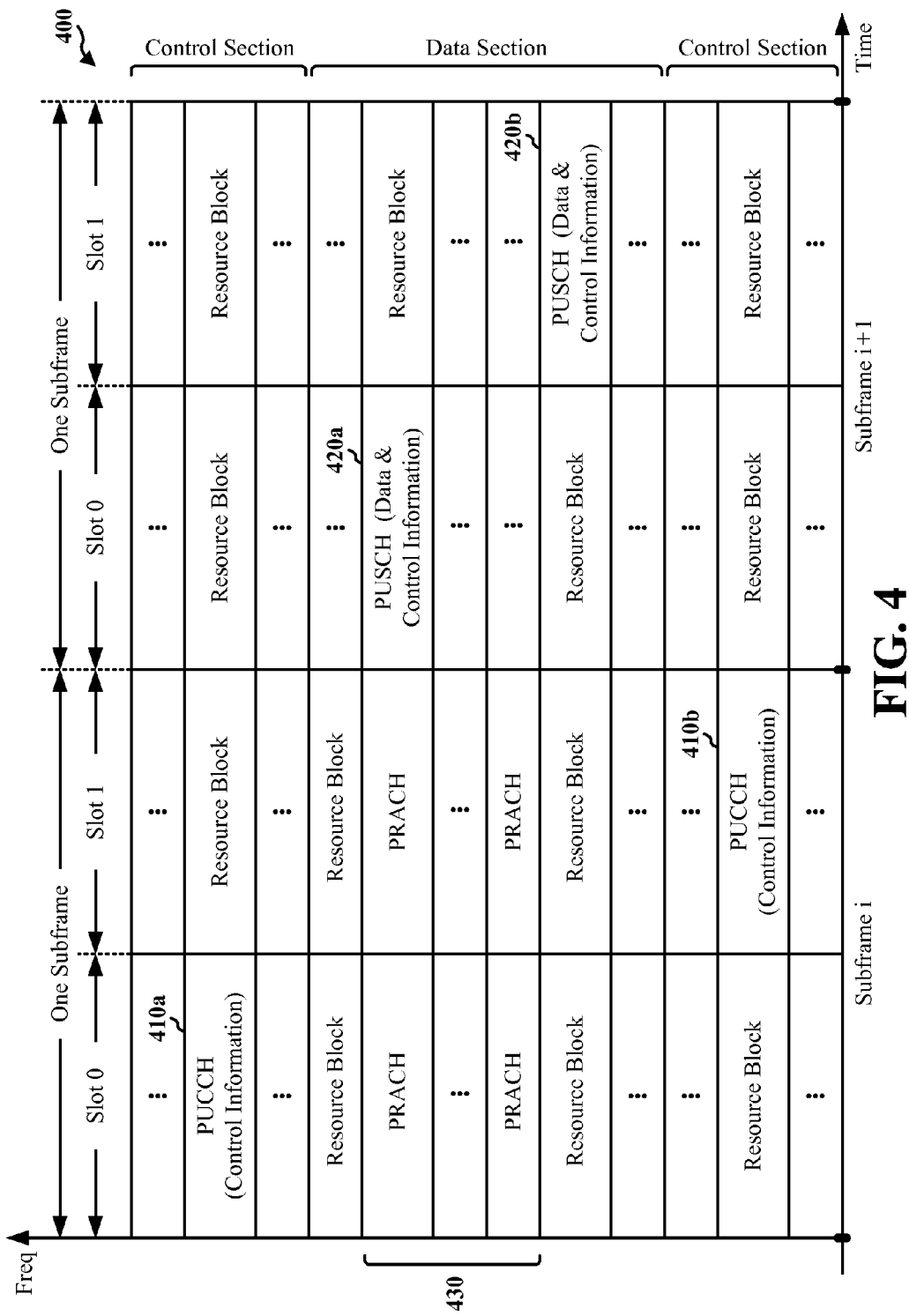
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
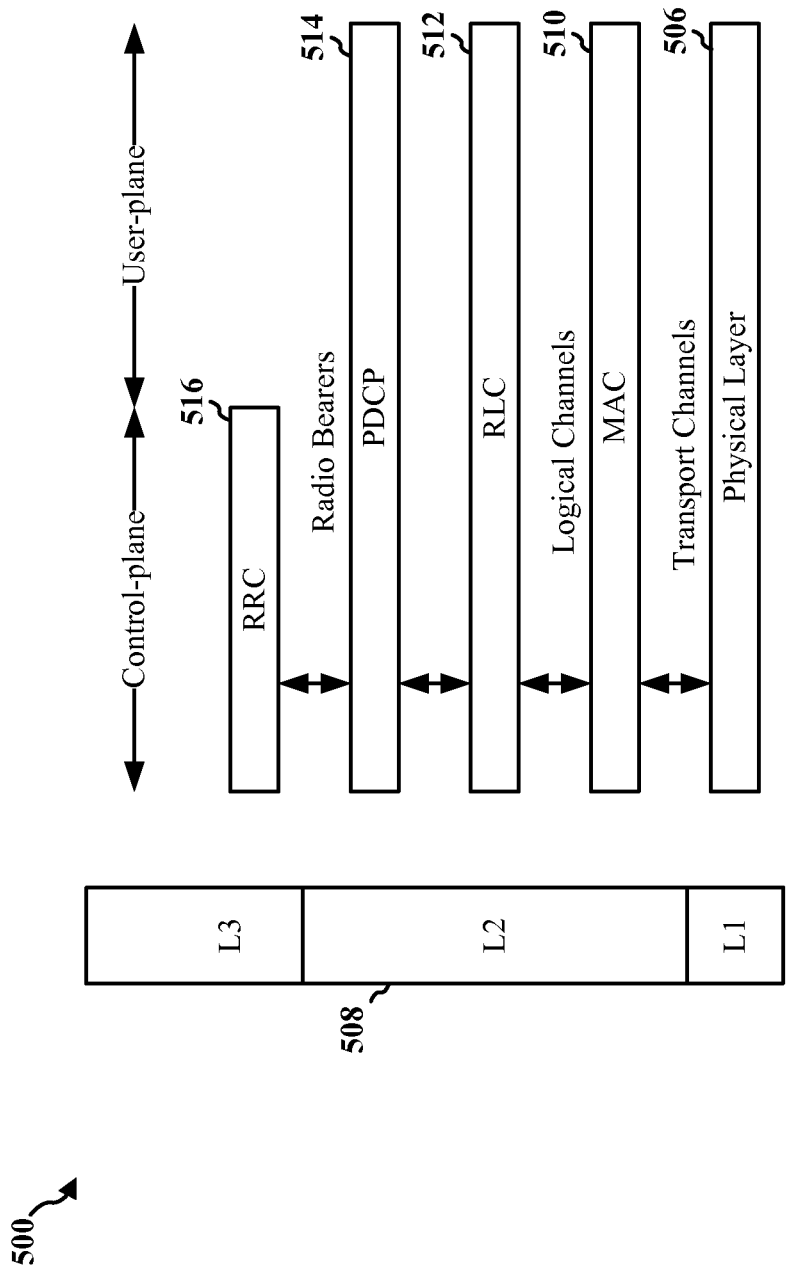
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
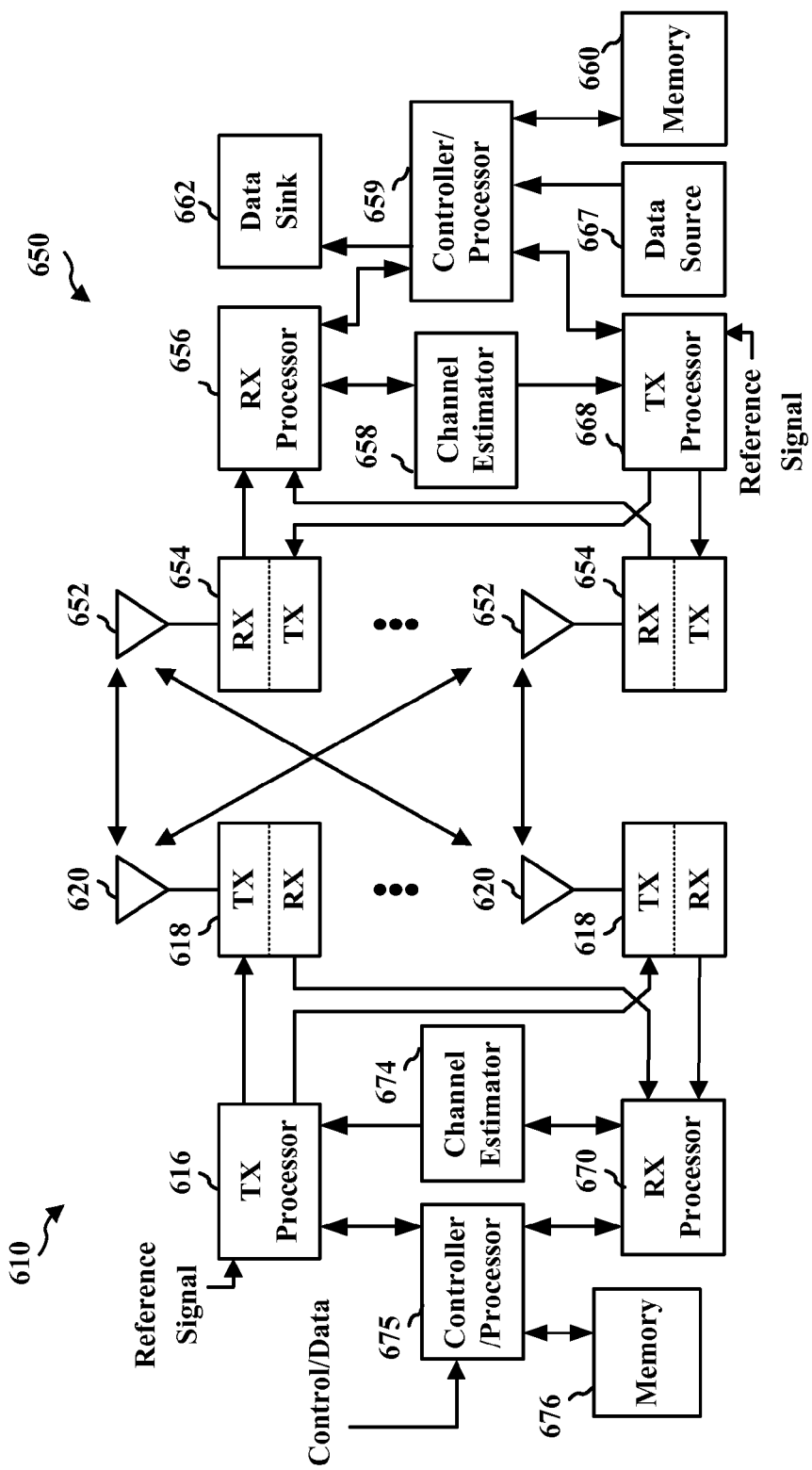
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
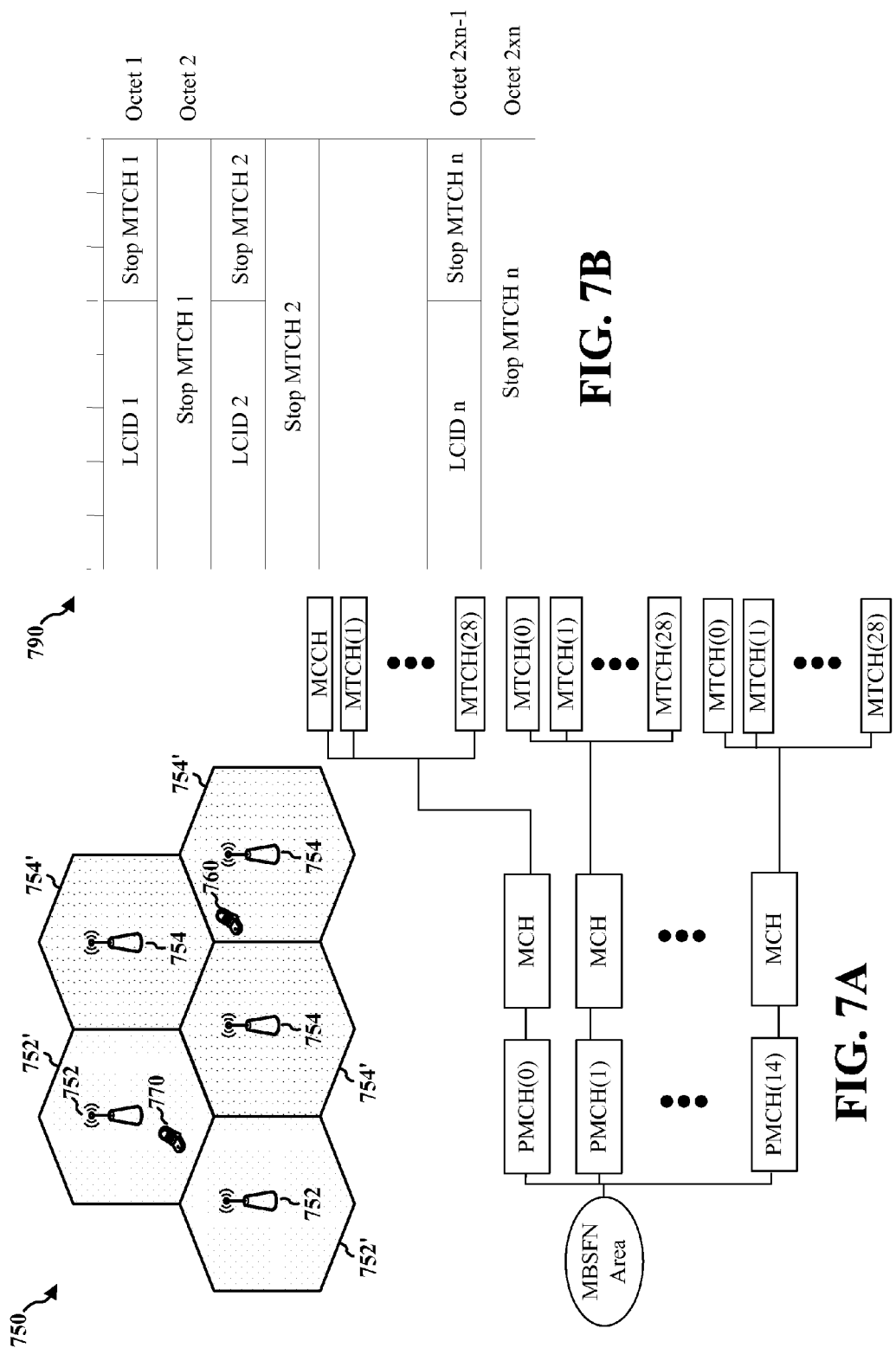
FIG. 7A is a diagram illustrating an example of an evolved Multimedia Broadcast Multicast Service channel configuration in a Multicast Broadcast Single Frequency Network.
FIG. 7B is a diagram illustrating a format of a Multicast Channel Scheduling Information Media Access Control control element.

FIG. 7A is a diagram 750 illustrating an example of an evolved MBMS (eMBMS) channel configuration in an MBSFN. The eNBs 752 in cells 752' may form a first MBSFN area and the eNBs 754 in cells 754' may form a second MBSFN area. The eNBs 752, 754 may each be associated with other MBSFN areas, for example, up to a total of eight MBSFN areas. A cell within an MBSFN area may be designated a reserved cell. Reserved cells do not provide multicast/broadcast content, but are time-synchronized to the cells 752', 754' and have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 7A, the first MBSFN area may support a first eMBMS broadcast service, such as by providing a particular news broadcast to UE 770. The second MBSFN area may support a second eMBMS broadcast service, such as by providing a different news broadcast to UE 760. Each MBSFN area supports a plurality of physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

A UE can camp on an LTE cell to discover the availability of eMBMS service access and a corresponding access stratum configuration. In a first step, the UE may acquire a system information block (SIB) 13 (SIB13). In a second step, based on the SIB13, the UE may acquire an MBSFN Area Configuration message on an MCCH. In a third step, based on the MBSFN Area Configuration message, the UE may acquire an MCH scheduling information (MSI) MAC control element. The SIB13 indicates (1) an MBSFN area identifier of each MBSFN area supported by the cell; (2) information for acquiring the MCCH such as an MCCH repetition period (e.g., 32, 64, . . . , 256 frames), an MCCH offset (e.g., 0, 1, . . . , 10 frames), an MCCH modification period (e.g., 512, 1024 frames), a signaling modulation and coding scheme (MCS), subframe allocation information indicating which subframes of the radio frame as indicated by repetition period and offset can transmit MCCH; and (3) an MCCH change notification configuration. There is one MBSFN Area Configuration message for each MBSFN area. The MBSFN Area Configuration message indicates both (1) a temporary mobile group identity (TMGI) and an optional session identifier of each MTCH identified by a logical channel identifier within the PMCH, (2) allocated resources (i.e., radio frames and subframes) for transmitting each PMCH of the MBSFN area and the allocation period (e.g., 4, 8, . . . , 256 frames) of the allocated resources for all the PMCHs in the area, and (3) an MCH scheduling period (MSP) (e.g., 8, 16, 32, . . . , or 1024 radio frames) over which the MSI MAC control element is transmitted.

FIG. 7B is a diagram 790 illustrating the format of an MSI MAC control element. The MSI MAC control element may be sent once each MSP. The MSI MAC control element may be sent in the first subframe of each scheduling period of the PMCH. The MSI MAC control element can indicate the stop frame and subframe of each MTCH within the PMCH. There may be one MSI per PMCH per MBSFN area.

The UTC is a time standard used by many different systems. In UTC, a day is exactly 86,400 international system (SI) seconds. However, one day is sometimes shorter or longer than 86,400 SI seconds. In fact, the length of the day changes due to climatic and geological events (e.g., earthquakes). As such, the UTC time-of-day slowly drifts apart from solar-based standards, such as Universal Time (UT1), which is a time scale based on the rotation of the Earth. The International Earth Rotation and Reference Systems Service (IERS) decides when leap seconds should be added to or removed from the UTC so that the difference between UTC and UT1 does not exceed 0.9 seconds.

A UE may use the UTC in relation to eMBMS services. Through a service announcement/discovery procedure, a UE may receive a user service description (USD). Once the UE has received the USD, the UE can camp on the cell to discover the availability of eMBMS services and receive a particular eMBMS service of interest. The USD provides eMBMS related information such as a temporary mobile group identity (TMGI) of an eMBMS service, a delivery method (e.g., download, streaming), a delivery protocol (e.g., file delivery over unidirectional transport (FLUTE)/user datagram protocol (UDP), real-time transport protocol (RTP) audio video profile (AVP) (RTP/AVP), etc.), a media type (e.g., audio, video, speech and timed text media, synthetic audio, still images, bitmap graphics, vector graphics, text, etc.), an Internet Protocol (IP) address and UDP port number to receive IP packets, an associated delivery (file repair and reception reporting) configuration, and a security configuration. Through a Session Description Protocol (SDP), the USD may also provide information regarding the start time and the end time of particular eMBMS services. As such, a UE may determine the start time and the end time of a particular eMBMS service of interest in relation to the UTC and may use the UTC to determine when to start acquiring the particular eMBMS service of interest. The USD may include a Media Presentation Description (MPD), which provides configuration information for receiving a dynamic adaptive streaming over hypertext transfer protocol (HTTP) (DASH) file segment. The configuration information may indicate when the DASH file segment should be rendered. A UE may use the UTC to determine the start time and the end time for a DASH file segment and determine when to render a DASH file segment based on the UTC. Furthermore, a UE may determine when data expires within a file description table (FDT) instance packet received in a FLUTE session. The data expiration time may affect when the UE can continue to use the configuration received in the FDT instance packet. A UE may also use the UTC to determine when to synchronize with an eNB, as current 3GPP standards require that the UE synchronize with an eNB within ±1 second referenced by the UTC. The UTC that the UE receives (e.g., from the non-access stratum (NAS) layer) may not be sufficiently accurate for synchronizing with an eNB or for use in relation to eMBMS services. As such, methods are needed to provide a more accurate UTC at the UE.

Figure 8:
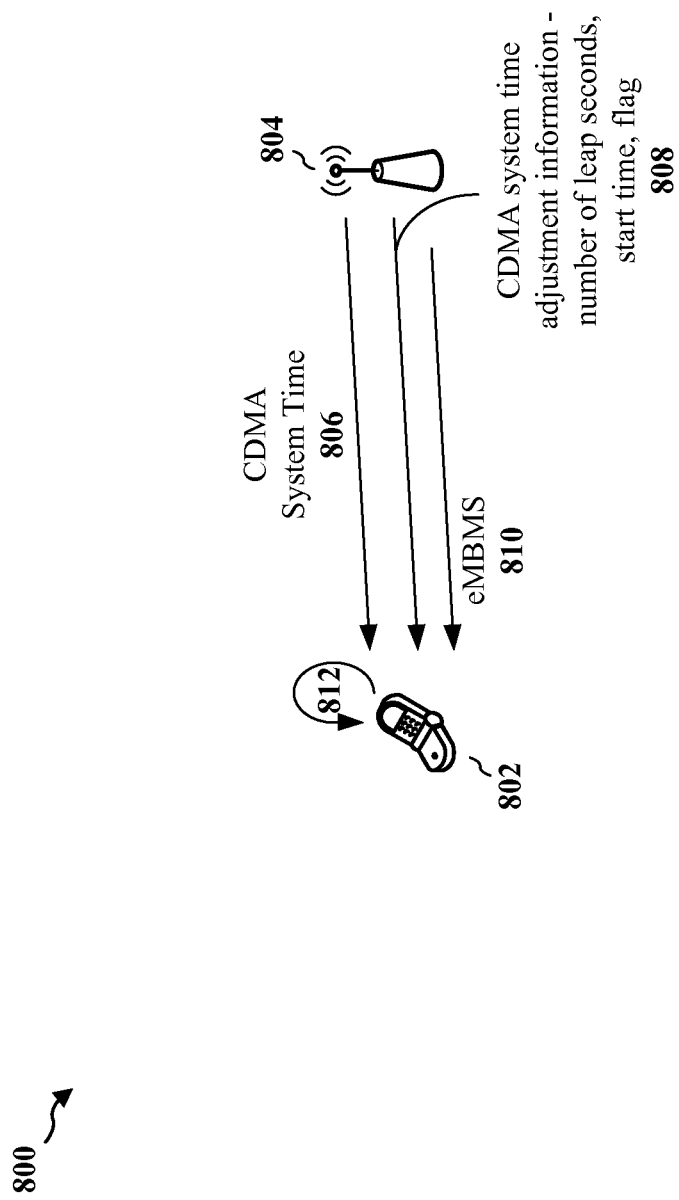
FIG. 8 is a diagram for illustrating an exemplary method for supporting UTC in LTE and specifically in eMBMS.

FIG. 8 is a diagram 800 for illustrating an exemplary method for supporting UTC in LTE and specifically in eMBMS. In the exemplary method, the UE 802 calculates the UTC based on a CDMA system time rather that use a received UTC. The CDMA system time was aligned with the UTC on Jan. 6, 1980 (also the start of the Global Positioning System (GPS) time). Since January 1980, 16 leap seconds have been added to the UTC. The most recent adjustment was at the end of Jun. 30, 2012 in which the UTC was adjusted (i.e., slowed down) by inserting one leap second. However, the CDMA system time does not take into account leap seconds. As such, the CDMA system time currently (as of May 25, 2013) leads the UTC by 16 seconds.

In the exemplary method, the UE 802 receives a CDMA system time 806 in system information from the eNB 804. The system information may be a SIB8, for example. The SIB8 includes a SystemTimeInfo parameter corresponding to a system frame number (SFN) boundary at or after the ending boundary of the system information window in which the SIB8 is transmitted from the eNB 804. The SystemTimeInfo includes the CDMA system time, which may be as accurate as ±10 μs. The UE 802 also receives CDMA system time adjustment information 808 including a number of leap seconds. The CDMA system time adjustment information 808 may further include a start time and/or a flag from the eNB 804. The number of leap seconds is the adjustment in seconds to obtain the UTC from the CDMA system time. The start time is the date at which the adjustment of the number of leap seconds is applicable. The flag indicates by how much the number of leap seconds is increasing or decreasing at the start time from a previous number of leap seconds. Based on the received CDMA system time 806 and the CDMA system time adjustment information 808, the UE 802 determines the UTC. The UE 802 then applies 812 the determined UTC, such as for example, to determine when to receive an eMBMS service 810.

The UE 802 may receive the CDMA system time adjustment information 808 in provisioning information at boot up. Alternatively, the UE 802 may receive the CDMA system time adjustment information 808 in a USD. The UE 802 may determine the UTC based on the CDMA system time $CDMA_{ST}$, the number of leap seconds n, and the flag f as follows:

if a current time is earlier than the start time, then $UTC=CDMA_{ST}-n+f$, otherwise if the current time is later than or equal to the start time, then $UTC=CDMA_{ST}-n$.

An example best demonstrates how the UE 802 determines the UTC. Assume the start time is Jul. 1, 2012, the number of leap seconds n is 16, and the flag f=1. The flag f=1 indicates that the number of leap seconds n increases by one on Jul. 1, 2012 (i.e., from 15 to 16). Before Jul. 1, 2012, the UE 802 would determine the UTC to equal $CDMA_{ST}-16+1$. However, on or after Jul. 1, 2012, the UE 802 would determine the UTC to equal $CDMA_{ST}-16$. By determining the UTC based on the CDMA system time $CDMA_{ST}$, the UE 802 is able to determine a UTC that is more accurate than a received UTC. With a more accurate UTC, the UE 802 will be able to synchronize more accurately with an eNB and/or to utilize a more accurate UTC in relation to eMBMS services.

As discussed supra, the IERS adds to or removes from the UTC so that the difference between UTC and UT1 does not exceed 0.9 seconds. If leap second adjustments are assumed never to exceed ±1 second, then the flag may indicate whether the number of leap seconds is increasing (i.e., adding a leap second) or decreasing (i.e., removing a leap second) at the start time from a previous number of leap seconds. In such a configuration, the UE 802 may determine the UTC based on the CDMA system time $CDMA_{ST}$ and the number of leap seconds n as follows:

if a current time is earlier than the start time, then
   if the flag indicates the number of leap seconds is increasing, then $UTC=CDMA_{ST}-n+1$, else if the flag indicates the number of leap seconds is decreasing, then $UTC=CDMA_{ST}-n-1$, otherwise if the current time is later than or equal to the start time, then $UTC=CDMA_{ST}-n$.

Figure 9:
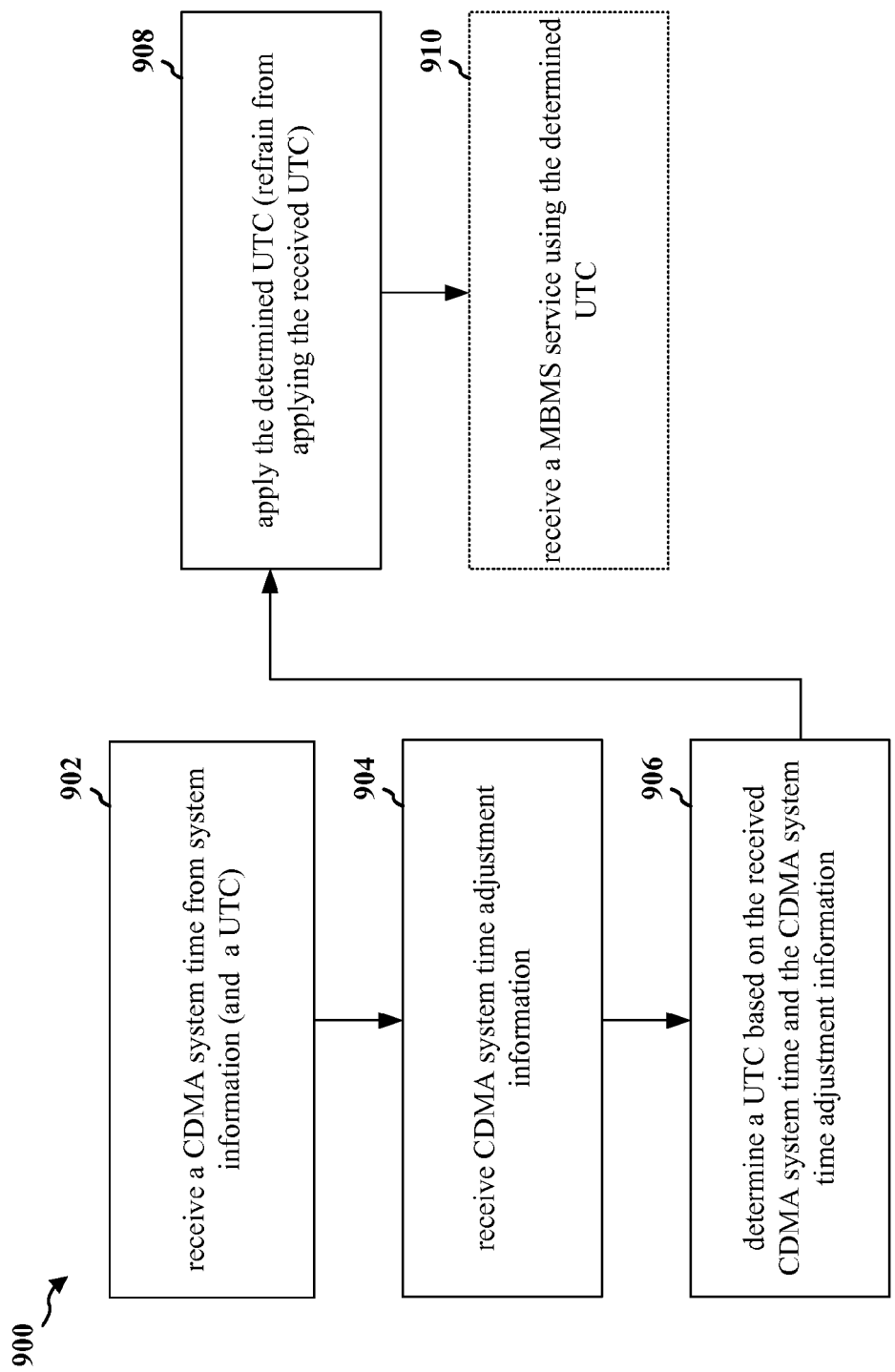
FIG. 9 is a flow chart of a method of wireless communication.

FIG. 9 is a flow chart 900 of a method of wireless communication. The method may be performed by a UE, such as the UE 802. At step 902, the UE receives a CDMA system time from system information, such as for example, a SIB, and more specifically a SIB8. At step 904, the UE receives CDMA system time adjustment information. The CDMA system time adjustment information includes a number of leap seconds and may further include a start time for an application of the number of leap seconds and/or a flag indicating by how much the number of leap seconds is increasing or decreasing at the start time from a previous number of leap seconds. The UE may receive the CDMA system time adjustment information at step 904 through provisioning information when the UE boots, through a received USD, or through other means. At step 906, the UE determines a UTC based on the received CDMA system time and the CDMA system time adjustment information. The UE may determine the UTC based on the CDMA system time $CDMA_{ST}$, the number of leap seconds n, and the flag f. At step 908, the UE applies the determined UTC. At step 910, the UE may receive an MBMS service using the determined UTC. As discussed supra, the UE may use the determined UTC in other ways, such as in relation to other eMBMS functions and/or for synchronizing with an eNB. At step 902, the UE may also receive a UTC (e.g., from the NAS layer). If the UE received a UTC at step 902, at step 908, the UE may refrain from applying the received UTC. Instead, at step 908, the UE applies the determined UTC, which is more accurate than the received UTC.

Figure 10:
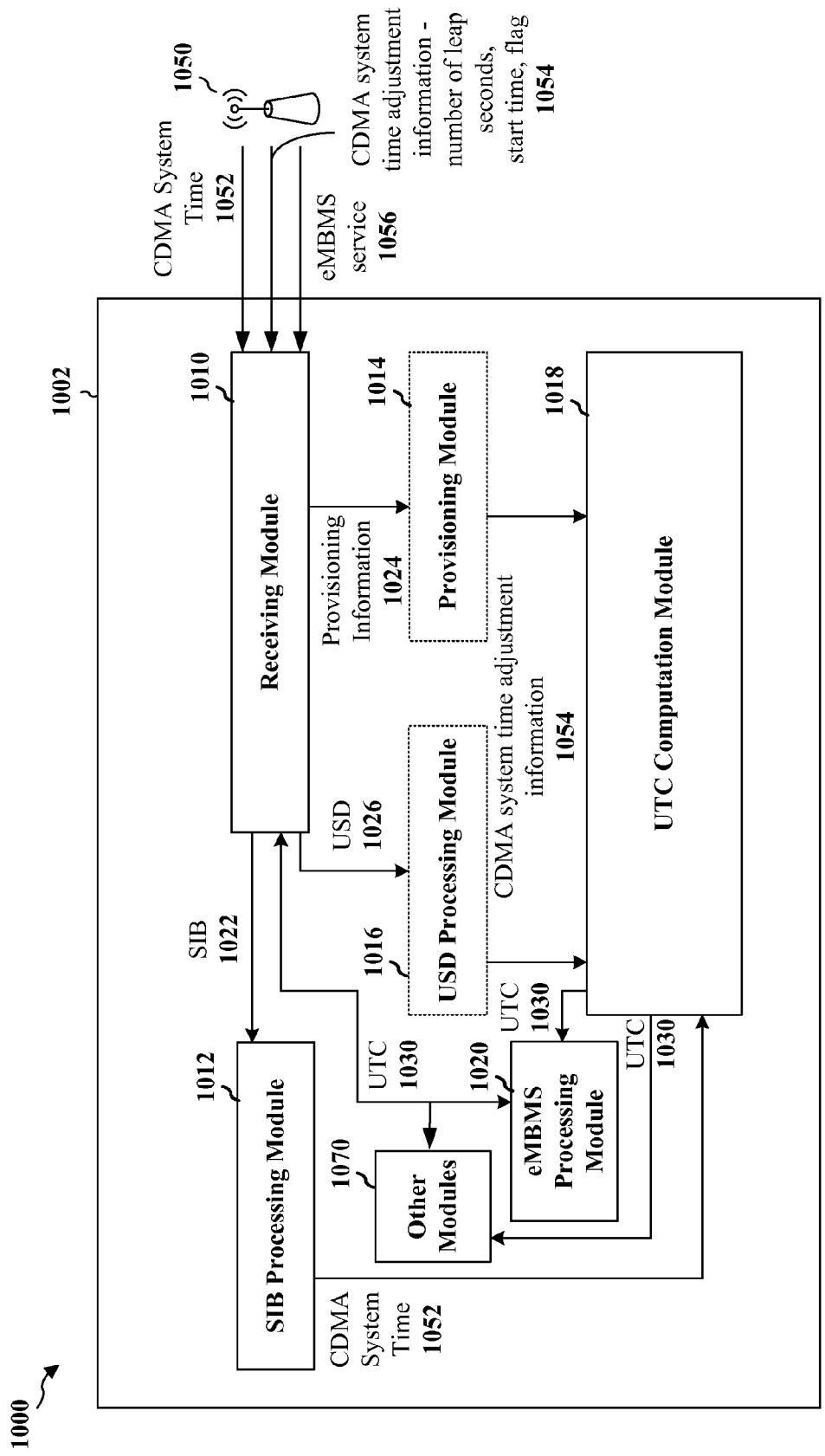
FIG. 10 is a conceptual data flow diagram illustrating the data flow between different modules/means/components in an exemplary apparatus.

FIG. 10 is a conceptual data flow diagram 1000 illustrating the data flow between different modules/means/components in an exemplary apparatus 1002. The apparatus may be a UE, such as the UE 802. The apparatus includes a receiving module 1010 that is configured to receive a CDMA system time 1052 in a SIB (e.g., SIB8) from the eNB 1050. The receiving module 1010 is also configured to receive information indicating CDMA system time adjustment information 1054 from the eNB 1050. The CDMA system time adjustment information 1054 includes a number of leap seconds and may further include a start time and/or a flag. The receiving module 1010 may also be configured to receive an eMBMS service 1056 from the eNB 1050. The receiving module 1010 is configured to provide the SIB 1022 to a SIB processing module 1012. The SIB processing module 1012 is configured to obtain the CDMA system time 1052 from the SIB 1022 and to provide the CDMA system time 1052 to a UTC computation module 1018. As discussed supra, the CDMA system time adjustment information 1054 may be received in provisioning information at boot up or in a USD. If the CDMA system time adjustment information 1054 is received in a USD, the receiving module 1010 may be configured to provide the USD 1026 to a USD processing module 1016, which is configured to provide the CDMA system time adjustment information 1054 to the UTC computation module 1018. If the CDMA system time adjustment information 1054 is received in provisioning information, the receiving module 1010 may be configured to provide the provisioning information 1024 to a provisioning module 1014, which is configured to provide the CDMA system time adjustment information 1054 to the UTC computation module 1018. The UTC computation module 1018 is configured to determine a UTC based on the received CDMA system time 1052 and the CDMA system time adjustment information 1054. The UTC computation module 1018 may compute the UTC as discussed supra. The UTC computation module 1018 may be configured to provide the determined UTC 1030 to an eMBMS processing module 1020. The eMBMS processing module 1020 may be configured to communicate the UTC 1030 to the receiving module 1010, or otherwise to control the receiving module 1010 based on the UTC 1030 in order to receive the eMBMS service 1056 based on the determined UTC 1030. The UTC computation module 1018 may provide the determined UTC to other modules 1070, which also apply the determined UTC. The receiving module 1010 may also be configured to receive a UTC (e.g., from the NAS layer). The receiving module 1010 may be configured to provide the received UTC to one or more modules, such as the eMBMS processing module 1020 and/or the other modules 1070. The eMBMS processing module 1020 and/or the other modules 1070 may be configured to refrain from applying the received UTC in favor of applying the more accurate determined UTC.

The apparatus may include additional modules that perform each of the steps of the algorithm in the aforementioned flow chart of FIG. 9. As such, each step in the aforementioned flow chart of FIG. 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
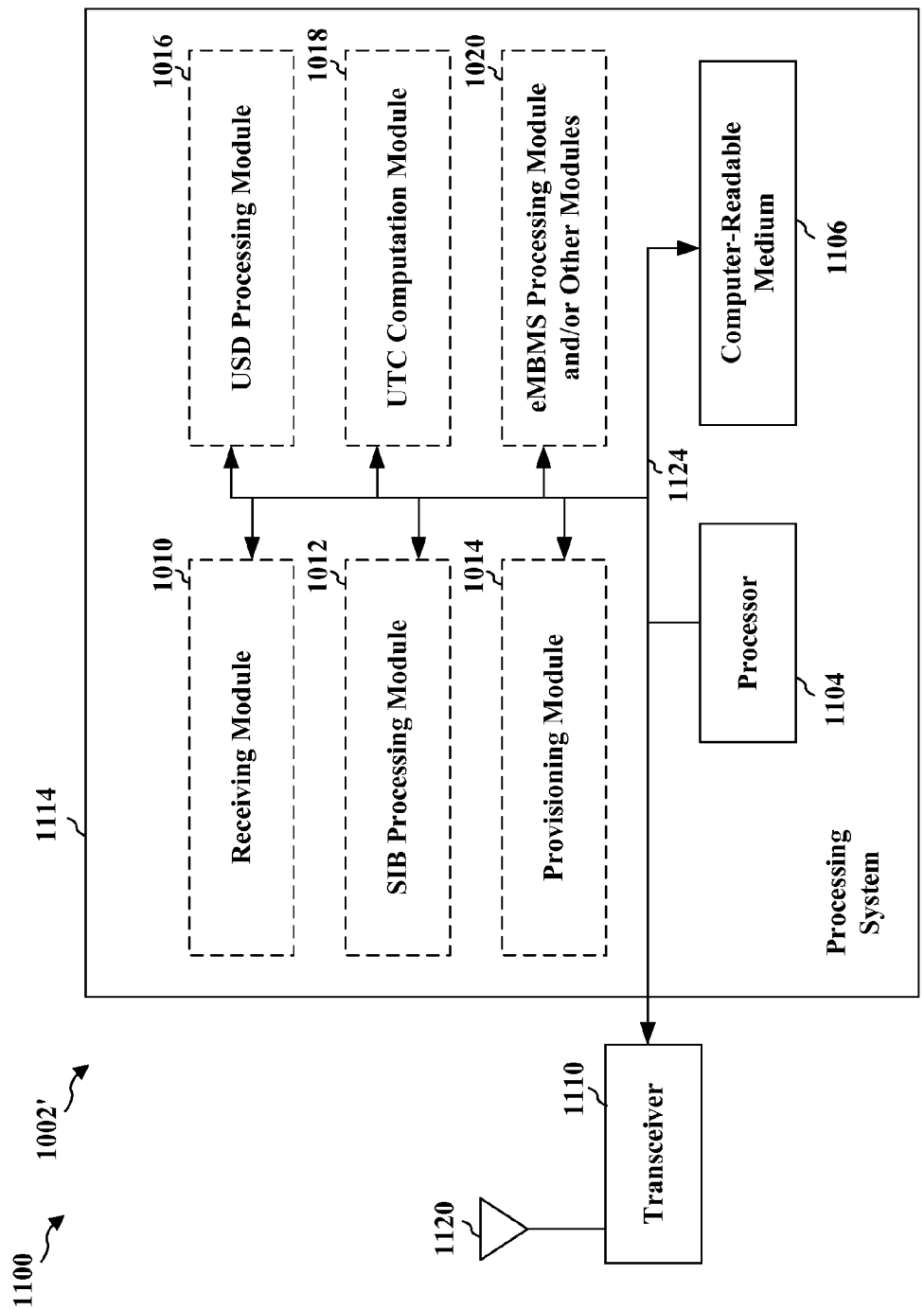
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the modules 1010, 1012, 1014, 1016, 1018, 1020, and the computer-readable medium 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114. In addition, the transceiver 1110 receives information from the processing system 1114, and based on the received information, generates a signal to be applied to the one or more antennas 1120. The processing system 1114 includes a processor 1104 coupled to a computer-readable medium 1106. The processor 1104 is responsible for general processing, including the execution of software stored on the computer-readable medium 1106. The software, when executed by the processor 1104, causes the processing system 1114 to perform the various functions described supra for any particular apparatus. The computer-readable medium 1106 may also be used for storing data that is manipulated by the processor 1104 when executing software. The processing system further includes at least one of the modules 1010, 1012, 1014, 1016, 1018, 1020. The modules may be software modules running in the processor 1104, resident/stored in the computer readable medium 1106, one or more hardware modules coupled to the processor 1104, or some combination thereof. The processing system 1114 may be a component of the UE 650 and may include the memory 660 and/or at least one of the TX processor 668, the RX processor 656, and the controller/processor 659.

In one configuration, the apparatus 1002/1002' for wireless communication includes means for receiving a CDMA system time from a SIB. The apparatus further includes means for receiving information indicating a number of leap seconds. The information may be received through provisioning information at boot up, through a received USD, or through some other means. The apparatus further includes means for determining a UTC based on the received CDMA system time and the number of leap seconds. The UTC may be determined as discussed supra. The apparatus further includes means for applying the determined UTC. If the apparatus receives a UTC (e.g., from the NAS layer), the apparatus may further include means for receiving a UTC and means for refraining from applying the received UTC so that the apparatus may apply the determined UTC. The apparatus may further include means for receiving an MBMS service using the determined UTC. The aforementioned means may be one or more of the aforementioned modules of the apparatus 1002 and/or the processing system 1114 of the apparatus 1002' configured to perform the functions recited by the aforementioned means. As described supra, the processing system 1114 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   receiving a code division multiple access (CDMA) system time from a system information block (SIB);
   receiving a user service description (USD) including information indicating a number of leap seconds and a start time for an application of the number of leap seconds, the USD being associated with multimedia broadcast multicast service (MBMS) services;
   determining a coordinated universal time (UTC) based on the received CDMA system time and based on the received USD indicating the number of leap seconds and the start time; and
   applying the determined UTC in association with at least one MBMS service of the MBMS services.

2. The method of claim 1, wherein the information includes a flag indicating by how much the number of leap seconds is increasing or decreasing at the start time from a previous number of leap seconds, and the UTC is further determined based on the flag.

3. The method of claim 2, wherein the UTC is determined based on the CDMA system time $CDMA_{ST}$, the number of leap seconds n, and the flag f as follows:
   if a current time is earlier than the start time, then $UTC = CDMA_{ST} - n + f,$ otherwise if the current time is later than or equal to the start time, then $UTC = CDMA_{ST} - n.$ 4. The method of claim 1, wherein the information includes one or both of a first time indicating a start of the at least one MBMS service or a second time indicating an end of the at least one MBMS service.

5. An apparatus for wireless communication, comprising:
   means for receiving a code division multiple access (CDMA) system time from a system information block (SIB);
   means for receiving a user service description (USD) including information indicating a number of leap seconds and a start time for an application of the number of leap seconds, the USD being associated with multimedia broadcast multicast service (MBMS) services;
   means for determining a coordinated universal time (UTC) based on the received CDMA system time and based on the received USD indicating the number of leap seconds and the start time; and
   means for applying the determined UTC in association with at least one MBMS service of the MBMS services.

6. The apparatus of claim 5, wherein the information includes a flag indicating by how much the number of leap seconds is increasing or decreasing at the start time from a previous number of leap seconds, and the UTC is further determined based on the flag.

7. The apparatus of claim 6, wherein the UTC is determined based on the CDMA system time $CDMA_{ST}$, the number of leap seconds n, and the flag f as follows:
   if a current time is earlier than the start time, then $UTC = CDMA_{ST} - n + f,$ otherwise if the current time is later than or equal to the start time, then $UTC = CDMA_{ST} - n.$ 8. The apparatus of claim 5, further comprising means for receiving an MBMS service using the determined UTC.

9. An apparatus for wireless communication, comprising:
   a memory; and
   at least one processor coupled to the memory and configured to:
      receive a code division multiple access (CDMA) system time from a system information block (SIB);
      receive a user service description (USD) including information indicating a number of leap seconds and a start time for an application of the number of leap seconds, the USD being associated with multimedia broadcast multicast service (MBMS) services;
      determine a coordinated universal time (UTC) based on the received CDMA system time and based on the received USD indicating the number of leap seconds and the start time; and
      apply the determined UTC in association with at least one MBMS service of the MBMS services.

10. The apparatus of claim 9, wherein the information includes a flag indicating by how much the number of leap seconds is increasing or decreasing at the start time from a previous number of leap seconds, and the UTC is further determined based on the flag.

11. The apparatus of claim 10, wherein the UTC is determined based on the CDMA system time $CDMA_{ST}$, the number of leap seconds n, and the flag f as follows:
    if a current time is earlier than the start time, then $UTC = CDMA_{ST} - n + f,$ otherwise if the current time is later than or equal to the start time, then $UTC = CDMA_{ST} - n.$ 12. The apparatus of claim 9, wherein the at least one processor is further configured to receive an MBMS service using the determined UTC.

13. A non-transitory computer-readable medium storing computer executable code for wireless communication, comprising code for:
    receiving a code division multiple access (CDMA) system time from a system information block (SIB);
    receiving a user service description (USD) including information indicating a number of leap seconds and a start time for an application of the number of leap seconds, the USD being associated with multimedia broadcast multicast service (MBMS) services;
    determining a coordinated universal time (UTC) based on the received CDMA system time and based on the received USD indicating the number of leap seconds and the start time; and
    applying the determined UTC in association with at least one MBMS service of the MBMS services.

14. The non-transitory computer-readable medium of claim 13, wherein the information includes a flag indicating by how much the number of leap seconds is increasing or decreasing at the start time from a previous number of leap seconds, and the UTC is further determined based on the flag.

15. The non-transitory computer-readable medium of claim 14, wherein the UTC is determined based on the CDMA system time $CDMA_{ST}$, the number of leap seconds n, and the flag f as follows:
    if a current time is earlier than the start time, then $UTC = CDMA_{ST} - n + f,$ otherwise if the current time is later than or equal to the start time, then $UTC = CDMA_{ST} - n.$ 16. The non-transitory computer-readable medium of claim 13, further comprising code for receiving an MBMS service using the determined UTC.

17. The method of claim 4, further comprising:
determining whether the determined UTC corresponds to the first time indicating the start of the at least one MBMS service;
receiving the at least one MBMS service based on determining that the determined UTC corresponds to the first time.

* * * * *